United States Patent
Heim

[15] 3,638,994
[45] Feb. 1, 1972

[54] INSTALLATION FOR CLOSING OR OPENING APERTURES IN VEHICLES

[72] Inventor: Gerhard Heim, Sindelfingen, Germany
[73] Assignee: Daimler-Benz Aktiengesellschaft, Stuttgart-Unterturkheim, Germany
[22] Filed: Aug. 17, 1970
[21] Appl. No.: 64,305

[30] Foreign Application Priority Data

Aug. 21, 1969 Germany.....................P 19 42 576.4

[52] U.S. Cl......................................................296/137 E
[51] Int. Cl. ......................................................B60j 7/10
[58] Field of Search......................296/137 E, 137 G, 137 R; 49/477; 220/46 P; 277/34.3

[56] References Cited

UNITED STATES PATENTS 2,973,991  3/1961   Werner..............................296/137 G
3,414,320  12/1968  Heim..................................296/137 E Primary Examiner—Leo Friaglia
Assistant Examiner—Robert R. Song
Attorney—Craig, Antonelli, Stewart & Hill

[57] ABSTRACT

An installation for closing and opening apertures in vehicles, such as openings for sliding roofs, in which a chamber adjustable in its height and its volume and adapted to be connected with a vacuum source is formed between an outer covering and a support part; the sidewalls of the chamber are formed by sectional members of approximately X-shaped cross section with four leg portions which extend elastically along the adjacent top and bottom walls of the chamber.

12 Claims, 4 Drawing Figures

INVENTOR
GERHARD HEIM

BY Craig, Antonelli, Stewart & Hill
ATTORNEYS

INSTALLATION FOR CLOSING OR OPENING APERTURES IN VEHICLES

The present invention relates to an installation including an outer covering and a support part for the closing or opening of apertures in vehicles, with a chamber adapted to be connected with a vacuum source, arranged between the outer covering and the support part and adjustable in its height and its volume, which engages at least in case of a reduction of its volume at the outer covering part and at the support part, and which includes springs arranged between the outer covering part and the support part and seeking to force the support and outer covering parts away from one another and the outer covering part against the edge area of the aperture and an actuating mechanism, as described in the copending U.S. application Ser. No. 781,502, now U.S. Pat. No. 3,580,629, assigned to the assignee of the present application.

It has been proposed in the aforementioned copending application to equip the installation constructed as sliding roof with the assist of some vacuum pressure boxes that are capable to pull the outer cover part toward the support part. On the one hand, sliding roofs are relatively large in surface and, on the other, the problems of sealing with respect to rainwater, etc., always occur in the edge areas of the sliding roofs which are nearly always of rectangular shape. Additionally, the outer covering, such as the outer body panel of the sliding roof has to pass over harmoniously into the outer body cover panel of the roof of the vehicle. No bulges or depressions must occur in connection therewith which stem either from the springs or from the chamber producing vacuum.

It is the aim of the present invention to provide a chamber guidance, by means of which it is possible to better displace the sealing forces into an area where one needs the same, which stresses the outer covering and the support part only little in bending so that one is able to construct the same of light weight, and which nevertheless only has such a chamber volume that the vacuum tank need not be constructed excessively large in order to enable also a repeated actuation when the engine stands still.

The underlying problems are solved according to the present invention in that the sidewalls of the chamber are constituted by a profile or sectional member forming an approximately X-shaped cross section, whose four legs are rubber-elastic, in that the bottom and top of the chamber are formed by the area of the outer covering and of the support part disposed opposite the profile member and in that the profile member extends along the outer area of the installation.

It is advantageous if the profile member is closed in itself. It would be quite feasible as such to provide the profile member also only over a partial area of the longitudinal and cross edges of a roof; however, one would then require a larger number of vacuum feed lines. If the profile member is closed in itself, then one necessitates maximum only two feed lines.

It is favorable if a crossweb connecting with each other the four leg portions is provided with air openings extending from one chamber half to the other chamber half. Only one single chamber results from such an arrangement, whose chamber halves communicate with each other so that also the feedline problems can be simplified.

It is also advantageous if the crossweb is a rigid, separately made profile member, preferably a metallic profile or section member whose edge areas are connected pairwise with the legs. As a result thereof, the legs, notwithstanding the fact that they are drawn toward one another in the presence of a vacuum, always assume the desired position and the air openings cannot be squeezed off.

It is appropriate if the crossweb is wide relative to the legs and if approximately V-shaped leaf springs are inserted into its air openings, which extend in the longitudinal direction of the chamber and which support themselves with one end thereof against the outer covering, with the bent center region thereof within the area of the air opening and with the other end thereof at the support part. In that the springs are displaced into the chamber, one is able to permit the springs to become effective within such areas of the installation which have to be able to withstand anyhow certain loads by reason of the forces produced by the chamber. This is realized in particular in a very simple manner by the leaf springs which are able to give off their force over a relatively large surface, can be easily manufactured and can be inserted readily into the air openings or passages.

Accordingly, it is an object of the present invention to provide an installation for closing and opening of apertures in vehicles which avoids by simple means the aforementioned shortcomings and drawbacks encountered in the prior art.

Another object of the present invention resides in an installation for closing or opening apertures in vehicles, particularly for opening and closing sliding roofs, which are simple in construction, permit lightweight construction of the parts and minimize the occurrence of bending stresses in the parts that may impair the external appearance.

A further object of the present invention resides in an installation for opening or closing sliding roofs in vehicles which are effective and reliable in operation yet necessitate a limited volume of the vacuum chamber so as not to require an excessively large vacuum tank.

Still another object of the present invention resides in an installation for opening or closing apertures in vehicles which permits simplification of the feed system and involves only parts that can be made relatively simply and inexpensively.

These and further objects, features and advantages of the present invention will become more obvious from the following description when taken in connection with the accompanying drawing which shows, for purposes of illustration only, one embodiment in accordance with the present invention, and wherein.

Figure 1:
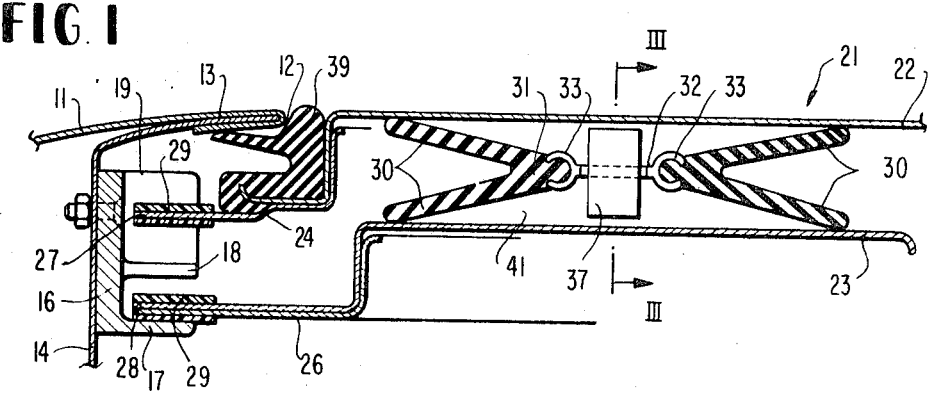
FIG. 1 is a partial cross-sectional view through an edge area of a closed sliding roof of a vehicle in accordance with the present invention.

Referring now to the drawing wherein like reference numerals are used throughout the various views to designate like parts, reference numeral 11 designates a roof of a motor vehicle in which is provided a cutout or aperture 12 that includes an inwardly drawn fold 13. A guide rail 16 is threadably secured at an inner sheet metal member 14, which includes a lower continuous or uninterrupted sliding track 17 and an interrupted sliding track 18 arranged closely above the track 17. Furthermore, an abutment 19 is provided.

A sliding roof generally designated by reference numeral 21 includes an outer covering 22 formed, for example, by an outer body panel, and a support part 23. Both the outer cover part 22 as also the support part 23 each are provided with an offset or cranked end portion 24 and 26, respectively. Tongue or flange portions 27 are provided at the angularly bent end portion 24 and tongue or flange portions 28 are provided at the angularly bent end portion 26.

These tongue or flange portions 27 and 28 project into the area of the guide rail 16 and are provided, like the latter, only within those areas of the sliding roof 21 or of the aperture 12 which are disposed parallel to the displacement direction. The tongue or flange portions 27 and 28 are surrounded by a layer 29 of conventional synthetic resinous material. The tongue or flange portions 28 remain constantly within the area between the slide track 17 and the slide track 18. The tongue or flange portions 27 may be disposed both below as also above the guide track 18. In order that the tongue or flange portions 27 are able to enter through the slide track 18, the latter is provided with the aforementioned openings which are equally long as the tongue or flange portions 27 and have such a position that the outer covering part 22 can move toward the support part 23 only when the sliding roof 21 is in its closed position. An X-shaped profile member 31 closed in itself is disposed along the outer areas of the sliding roof 21, which includes four leg portions 30 whereby the leg portions disposed one above the other are made in one piece at the base thereof.

Figure 4:
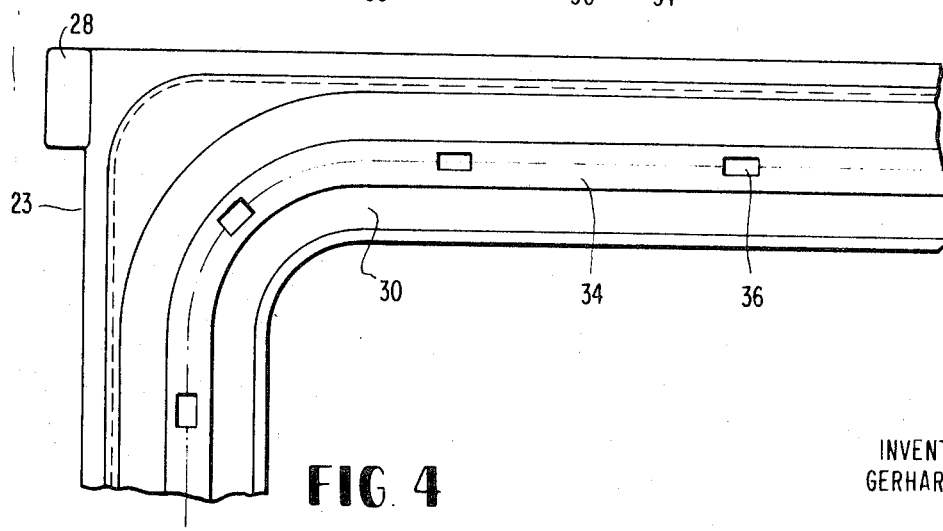
FIG. 4 is a partial plan view on a corner area of the sliding roof in accordance with the present invention with a removed outer covering.

Furthermore, a metallic extrusion member 32 is provided that is band-shaped and engages with clamps 33 into the leg portions 30. Rectangular air passages or openings 36 are provided in the center web 34 of the extrusion profile 32. Two V-shaped leaf springs 37 each are inserted into a respective air opening 36 which are not illustrated in FIG. 4. In their center area 38, the leaf springs 37 are so constructed and shaped that one is able to clamp the same over the center web 34. An appropriately constructed rubber profile member 39 is additionally provided within the area of the angularly bent end portion 24 which can be forced sealingly against the fold 13 from below.

OPERATION

Figure 2:
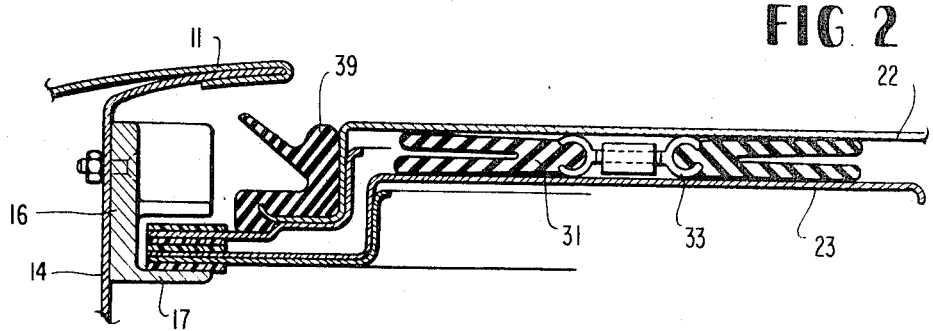
FIG. 2 is a partial cross-sectional view, similar to FIG. 1, illustrating the sliding roof in the position in which it can be displaced.
Figure 3:
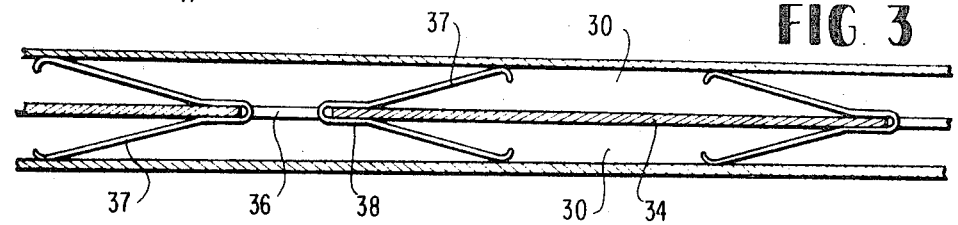
FIG. 3 is a partial longitudinal cross-sectional view, taken along line III—III of FIG. 1.

The installation according to the present invention operates as follows:

It is assumed that the engine of the vehicle runs and that the sliding roof 21 is closed. A vacuum line (not shown) leads from the suction manifold (not shown) of the engine up to the chamber 41 formed by the leg portions 30 and a part of the outer covering part 22 as well as the support part 23. If one permits to this vacuum, for example, by shifting a switch (not shown), to draw the air out of the chamber 41, then the edge areas of the leg portions 30 abut sealingly against the outer covering 22 and the support part 23 and the air is completely evacuated out of the chamber 41. As a result thereof, the atmospheric air pressure forces the outer covering part 22 against the support part 23. The tongue portions 27 thereby enter through the apertures into the slide track 18 and reach the position illustrated in FIG. 2. The sliding roof 21 can now be pushed back whereby the relative position of the outer covering and support parts 22 and 23 as shown in FIG. 2 remains preserved. During this period of time, the vacuum remains connected to the chamber 41. If one now turns off, i.e., disconnects the vacuum and permits atmospheric air to flow into the chamber 41 by means of the same switch, then the force of the leaf springs 37 dominates which now seek to force away from one another the outer covering 22 and the support part 23, however, only so far until the synthetic resinous material layer 29 of the upper tongue or flange portion 27 abuts from below against the slide track 18. The sliding roof 21 is now stopped in any desired opening position. The sliding roof 21 can be pushed up by the leaf springs 37 into the closing position only in the most forward position because an aperture for the tongue or flange portions 27 exists in the slide track 18 only at this place. This aperture is defined and secured on both sides by means of abutments 29. In every other displaced position, the flange or tongue portions 27 of the slide track 18 prevent the complete spreading apart of the sliding roof 21.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. An installation for closing or opening apertures in vehicles, which includes an outer covering means and a support means as well as a chamber means adapted to be connected with a vacuum source and arranged between the outer covering means and the support means and adjustable in its height and its volume, spring means arranged between the outer covering means and the support means and seeking to spread apart the support means and the outer covering means and to force the latter against the edge area of the aperture, and actuating means for said chamber, characterized in that the sidewalls of the chamber means are constituted by at least one profile member forming an approximately X-shaped cross section, said profile member having four elastic leg portions, and the upper and lower wall portions of the chamber means being formed by areas of the outer cover and of the support means facing the profile member.

2. An installation according to claim 1, characterized in that the profile member extends along the outer areas of the installation.

3. An installation according to claim 1, characterized in that the profile member is closed in itself.

4. An installation according to claim 3, characterized by a crossweb member connecting with each other the four leg portions of the profile member and provided with at least one air aperture extending from one chamber half to the other.

5. An installation according to claim 4, characterized in that the crossweb member is a rigid, separately made profile member whose edge areas are connected pairwise with the leg portions.

6. An installation according to claim 5, characterized in that said crossweb member is a metallic profile member.

7. An installation according to claim 5, characterized in that said crossweb member is wide relative to the leg portions and in that approximately V-shaped leaf springs are inserted into the air apertures thereof, said leaf springs extending in the longitudinal direction of the chamber means and being supported at one end thereof against the outer covering means, with the bent center area thereof within the area of a respective air aperture and with the other end thereof at the support means.

8. An installation according to claim 7, characterized in that the profile member is closed in itself.

9. An installation according to claim 1, characterized by a crossweb member connecting with each other the four leg portions of the profile member and provided with at least one air aperture extending from one chamber half to the other.

10. An installation according to claim 9, characterized in that the crossweb member is a rigid, separately made profile member whose edge areas are connected pairwise with the leg portions.

11. An installation according to claim 10, characterized in that said crossweb member is a metallic profile member.

12. An installation according to claim 9, characterized in that said crossweb member is wide relative to the leg portions and in that approximately V-shaped leaf springs are inserted into the air apertures thereof, said leaf springs extending in the longitudinal direction of the chamber means and being supported at one end thereof against the outer covering means, with the bent center area thereof within the area of a respective air aperture and with the other end thereof at the support means.

* * * * *